(12) United States Patent
Hashimoto et al.

(10) Patent No.: US 11,168,215 B2
(45) Date of Patent: Nov. 9, 2021

(54) ASPHALT COMPOSITION

(71) Applicant: KAO CORPORATION, Tokyo (JP)

(72) Inventors: Ryoichi Hashimoto, Iwade (JP); Ryoji Iwamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 127 days.

(21) Appl. No.: 16/630,992

(22) PCT Filed: Jul. 17, 2018

(86) PCT No.: PCT/JP2018/026719
§ 371 (c)(1),
(2) Date: Jan. 14, 2020

(87) PCT Pub. No.: WO2019/017334
PCT Pub. Date: Jan. 24, 2019

(65) Prior Publication Data
US 2020/0224033 A1 Jul. 16, 2020

(30) Foreign Application Priority Data

Jul. 18, 2017 (JP) .............................. JP2017-139232
Jul. 17, 2018 (JP) .............................. JP2018-134127

(51) Int. Cl.
*C08L 95/00* (2006.01)
*C08L 9/06* (2006.01)
*C08L 67/02* (2006.01)

(52) U.S. Cl.
CPC .................. *C08L 95/00* (2013.01); *C08L 9/06* (2013.01); *C08L 67/02* (2013.01)

(58) Field of Classification Search
CPC ............ C08L 95/00; C08L 67/02; C08L 9/06
See application file for complete search history.

(56) References Cited

U.S. PATENT DOCUMENTS

| | | | |
|---|---|---|---|
| 5,328,943 A | 7/1994 | Isobe et al. | |
| 5,708,062 A | 1/1998 | Maillet et al. | |
| 5,990,206 A | 11/1999 | Tanaka et al. | |
| 2014/0378603 A1 | 12/2014 | Avramidis et al. | |
| 2017/0226343 A1 | 8/2017 | Kim | |
| 2019/0233647 A1 | 8/2019 | Takahashi et al. | |
| 2019/0359827 A1 | 11/2019 | Shirai | |

FOREIGN PATENT DOCUMENTS

| | | |
|---|---|---|
| CN | 1166850 A | 12/1997 |
| CN | 101608069 A | 12/2009 |
| CN | 103509356 A | 1/2014 |
| CN | 106012734 A | 10/2016 |
| EP | 0 425 151 A1 | 5/1991 |
| EP | 3124546 A1 | 2/2017 |
| EP | 3 476 899 A1 | 5/2019 |
| EP | 3 405 525 B1 | 11/2019 |
| EP | 3 656 821 A1 | 5/2020 |
| JP | 4-8766 A | 1/1992 |
| JP | 6-116500 A | 4/1994 |
| JP | 06116500 A * | 4/1994 |
| JP | 9-227190 A | 9/1997 |
| JP | 2000-169208 A | 6/2000 |
| JP | 2001-72862 A | 3/2001 |
| JP | 2005-126998 A | 5/2005 |
| JP | 2005-307218 A | 11/2005 |
| JP | 2006-124460 A | 5/2006 |
| JP | 2008-223463 A | 9/2008 |
| JP | 2013-222044 A | 10/2013 |
| JP | 2015-227025 A | 12/2015 |
| JP | 2019-508608 A | 3/2019 |
| JP | 2020-117702 A | 8/2020 |
| KR | 10-1647298 B1 | 8/2016 |

(Continued)

OTHER PUBLICATIONS

English Machine Translation of Yukio, et al. (JP H06116500 A) obtained https://worldwide.espacenet.com/publicationDetails/biblio?CC=JP&NR=H06116500A&KC=A&FT=D&ND=3&date=19940426&DB=EPODOC&locale=en_EP# (Year: 1994).*
U.S. Appl. No. 16/631,087, filed Jan. 14, 2020.
International Search Report for International Application No. PCT/JP2018/026720, dated Sep. 25, 2018, with English translation.
Extended European Search Report for European Application No. 18834907.0, dated Feb. 26, 2021.
Moghaddam et al., "Properties of SMA Mixtures Containing Waste Polyethylene Terephthalate," International Journal of Chemical and Biological Engineering, vol. 6, 2012. pp. 188-191, XP055282643.
Ge et al., "Properties of plastic mortar made with recycled polyethylene terephthalate", Construction and Building Materials, 2014, vol. 73, pp. 682-687.

(Continued)

*Primary Examiner* — Arrie L Reuther
(74) *Attorney, Agent, or Firm* — Birch, Stewart, Kolasch & Birch, LLP

(57) ABSTRACT

The present invention relates to an asphalt composition having excellent durability after being dried, an asphalt mixture, and a method for producing an asphalt mixture.

Disclosed are [1] an asphalt composition containing asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is 1 part by mass or more and 17 parts by mass or less based on 100 parts by mass of the asphalt; [2] an asphalt mixture including the asphalt composition as set forth [1] and an aggregate; and [3] a method for producing an asphalt mixture, including a step of mixing a heated aggregate, asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is 1 part by mass or more and 17 parts by mass or less based on 100 parts by mass of the asphalt.

10 Claims, No Drawings

(56) References Cited

FOREIGN PATENT DOCUMENTS

| WO | WO 96/23010 A2 | 8/1996 |
| WO | WO 2007/068990 A1 | 6/2007 |
| WO | WO 2013/152113 A1 | 10/2013 |
| WO | WO 2017/125421 A1 | 7/2017 |
| WO | WO 2018/003151 A1 | 1/2018 |
| WO | WO 2018/037771 A1 | 3/2018 |
| WO | WO 2018/134921 A1 | 7/2018 |

OTHER PUBLICATIONS

International Search Report, issued in PCT/JP2018/026719, dated Oct. 9, 2018.
Modarres et al., "Effect of waste plastic bottles on the stiffness and fatigue properties of modified asphalt mixes", Materials and Design, 2014, vol. 61, pp. 8-15.
Ahmad el al., "Utilization of polyethylene terephthalate (PET) in asphalt pavement: A review", IOP Conf. Series: Materials Science and Engineering, 2017, vol. 203, pp. 1-7 ( 8 pages).
Extended European Search Report, dated Oct. 9, 2020, for European Application No. 18835024.3.

\* cited by examiner

ASPHALT COMPOSITION

FIELD OF THE INVENTION

The present invention relates to an asphalt composition to be used for road pavement, an asphalt mixture, and a method for producing an asphalt mixture.

BACKGROUND OF THE INVENTION

An asphalt pavement using an asphalt composition has been frequently performed for paving driveways, parking spaces, cargo yards, sidewalks, etc., because of relatively easy construction and a short period of time from beginning of paving works to traffic start.

The asphalt pavement includes a road surface which is formed of an asphalt mixture containing aggregates bonded with each other through asphalt, and hence, paved roads exhibit good hardness and durability.

However, a rut of a wheel or a crack is generated on the asphalt pavement surface due to long-term use. Therefore, in such a case, repair of the pavement is inevitably needed, which results in increased maintenance costs and significant influence on car traffic.

PTL 1 describes a waste toner-containing paving material containing 100 parts by weight of asphalt and 1 to 10 parts by weight of a waste toner. PTL 1 describes that according to the foregoing paving material, not only a paving material having excellent flowability resistance, abrasion resistance, and crack resistance is provided upon being blended with a toner that is the waste, but also the waste toner which has hitherto been treated as an industrial waste is reused.

CITATION LIST

Patent Literature

PTL 1: JP 2000-169208 A

SUMMARY OF THE INVENTION

Embodiments of the present invention are concerned with the following [1] to [3].
[1] An asphalt composition containing asphalt, a thermoplastic elastomer, and a polyester, wherein
the polyester has a softening point of 90° C. or higher and 140° C. or lower and a glass transition point of 40° C. or higher and 80° C. or lower, and
a ratio of the polyester is 1 part by mass or more and 17 parts by mass or less based on 100 parts by mass of the asphalt.
[2] An asphalt mixture including the asphalt composition as set forth above in [1] and an aggregate.
[3] A method for producing an asphalt mixture, including a step of mixing a heated aggregate, asphalt, a thermoplastic elastomer, and a polyester, wherein
the polyester has a softening point of 90° C. or higher and 140° C. or lower and a glass transition point of 40° C. or higher and 80° C. or lower, and
a ratio of the polyester is 1 part by mass or more and 17 parts by mass or less based on 100 parts by mass of the asphalt.

DETAILED DESCRIPTION OF THE INVENTION

Hitherto, in the case of using a composition containing asphalt and a polyester, an asphalt composition having strong dry strength is obtained; however, there is demanded an asphalt composition capable of forming a paved surface which is much more hardly rutted and exhibits excellent durability.

Then, embodiments of the present invention are concerned with an asphalt composition which is excellent in durability of a paved surface after laying, an asphalt mixture, and a method for producing an asphalt mixture.

The embodiments of the present invention are concerned with the aforementioned [1] to [3].

In accordance with the embodiments of the present invention, it is possible to provide an asphalt composition which is excellent in durability of a paved surface after laying, an asphalt mixture, and a method for producing an asphalt mixture.

[Asphalt Composition]

The asphalt composition according to the embodiment of the present invention (hereinafter also referred to simply as "asphalt composition") contains asphalt, a thermoplastic elastomer, and a polyester.

The polyester has a softening point of 90° C. or higher and 140° C. or lower and a glass transition point of 40° C. or higher and 80° C. or lower.

Furthermore, a ratio of the polyester is 1 part by mass or more and 17 parts by mass or less based on 100 parts by mass of the asphalt.

According to the foregoing, an asphalt composition which is excellent in durability of the paved surface after laying (hereinafter also referred to simply as "durability") is obtained. Furthermore, by applying this technology, an asphalt mixture and a method for producing an asphalt mixture can be provided.

Although reasons why the effects of the embodiments of the present invention are obtained are not always elucidated yet, the following may be considered.

It may be considered that in view of the fact that the polyester has a softening point equal to or higher than a predetermined value and a glass transition point equal to or higher than a predetermined value, not only it exhibits a high intermolecular force (van der Waals force) to undergo an intermolecular interaction with the thermoplastic elastomer that is an asphalt-modifying component, but also it adsorbs on the aggregate.

In the case where the polyester has a softening point of a range equal to or lower than the predetermined value and a glass transition point of a range equal to or lower than the predetermined value, by imparting an effect for anchoring an aggregate on asphalt, which when using only a thermoplastic elastomer, has been unable to be realized so far, the flowability resistance is improved, and the durability of the paved surface after laying is improved, while remaining flexibility of the thermoplastic elastomer.

Definitions and so on regarding various terminologies in this specification are hereunder described.

A "binder mixture" means a mixture of asphalt and a thermoplastic elastomer, and for example, it has a concept including modified asphalt with a thermoplastic elastomer as mentioned later.

In the polyester, an "alcohol component-derived structural unit" means a structure resulting from eliminating a hydrogen atom from a hydroxy group of the alcohol component, and a "carboxylic acid component-derived structural unit" means a structure resulting from eliminating a hydroxy group from a carboxy group of the carboxylic acid component.

A "carboxylic acid compound" has a concept including not only a carboxylic acid thereof but also an anhydride which is decomposed during the reaction to form an acid and an alkyl ester of carboxylic acid (for example, the carbon number of the alkyl group is 1 or more and 3 or less).

In the case where the carboxylic acid compound is an alkyl ester of carboxylic acid, the carbon number of the alkyl group that is an alcohol residue of the ester is not calculated for the carbon number of the carboxylic acid compound.

[Asphalt]

As the asphalt, for example, various kinds of asphalts can be used. Examples thereof include in addition to straight asphalt that is petroleum asphalt for pavement, blown asphalt.

The straight asphalt refers to a residual bituminous material obtained by treating a crude oil with an atmospheric distillation apparatus, a vacuum distillation apparatus, or the like.

The blown asphalt means asphalt obtained by heating a mixture of straight asphalt and a heavy oil and then blowing air to undergo oxidation.

Of these, from the viewpoint of versatility, straight asphalt is preferred.

A penetration of the asphalt is preferably more than 40, and it is preferably 120 or less, more preferably 80 or less, and still more preferably 60 or less. A measurement method of the penetration conforms to the method prescribed in JIS K2207:2006. When a prescribed needle penetrates vertically into a sample under a test condition described in JIS K2207:2006, 0.1 mm of a length of the needle penetrated into the sample is expressed as 1.

The content of the asphalt in the asphalt composition is preferably 60% by mass or more, more preferably 70% by mass or more, still more preferably 75% by mass or more, and yet still more preferably 80% by mass or more, and it is preferably 98% by mass or less, more preferably 96% by mass or less, and still more preferably 95% by mass or less.

[Thermoplastic Elastomer]

Examples of the thermoplastic elastomer include a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer.

Examples of a commercially available product of the ethylene/acrylic acid ester copolymer include "Elvaroy" (manufactured by DuPont de Nemours, Inc.).

Of these thermoplastic elastomers, from the viewpoint of more improving the durability, a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer are preferred; and a styrene/butadiene random copolymer and a styrene/butadiene/styrene block copolymer are more preferred.

From the viewpoint of more improving the durability, the content of the thermoplastic elastomer in the asphalt composition is preferably 0.1% by mass or more, more preferably 0.5% by mass or more, still more preferably 1% by mass or more, and yet still more preferably 2% by mass or more, and it is preferably 30% by mass or less, more preferably 20% by mass or less, still more preferably 10% by mass or less, and yet still more preferably 5% by mass or less.

In the asphalt composition, from the viewpoint of more improving the durability, a ratio of the thermoplastic elastomer is preferably 0.1 parts by mass or more, more preferably 0.5 parts by mass or more, still more preferably 1 part by mass or more, and yet still more preferably 2 parts by mass or mire, and it is preferably 30 parts by mass or less, more preferably 20 parts by mass or less, still more preferably 10 parts by mass or less, and yet still more preferably 5 parts by mass or less based on 100 parts by mass of the asphalt.

It is preferred that the asphalt and the thermoplastic elastomer are used as a binder mixture that is a mixture of these materials. Examples of the binder mixture include straight asphalt that is asphalt modified with a thermoplastic elastomer (the straight asphalt will be hereinafter also referred to as "modified asphalt").

[Polyester]

From the viewpoint of more improving the durability of the paved surface after laying, the polyester preferably contains an alcohol component-derived structural unit containing 60 mol % or more of an alkylene oxide adduct of bisphenol A and a carboxylic acid component-derived structural unit.

From the viewpoint of more improving the durability, the polyester according to a first embodiment contains 50 mol % or more of an aromatic dicarboxylic acid compound based on the carboxylic acid component.

From the viewpoint of more improving the durability, the polyester according to a second embodiment contains 50 mol % or more of an aliphatic dicarboxylic acid compound based on the carboxylic acid component.

<Alcohol Component>

Examples of the alcohol component include diols and trihydric or higher-hydric and octahydric or lower-hydric alcohols.

Examples of the alcohol component include aliphatic diols, aromatic diols, and trihydric or higher-hydric alcohols. These alcohol components can be used alone or in combination of two or more thereof.

From the view of obtaining excellent durability, the alcohol component preferably contains an alkylene oxide adduct of bisphenol A, and more preferably contains an alkylene oxide adduct of bisphenol A represented by the following formula (I):

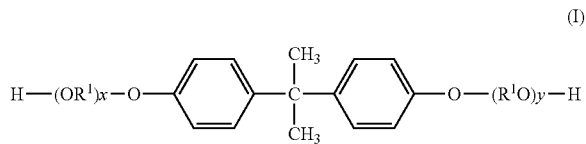

(I)

wherein $OR^1$ and $R^1O$ each represent an alkylene oxide; $R^1$ represents an alkylene group having 2 or 3 carbon atoms; x and y each represent a positive number expressing an average addition molar number of the alkylene oxide; and a sum total of x and y is 1 or more, and preferably 1.5 or more, and it is 16 or less, preferably 8 or less, and more preferably 4 or less.

It may be considered that in view of the fact that the polyester contains an alcohol component-derived structural unit containing 60 mol % or more of an alkylene oxide adduct of bisphenol A, the polyester not only undergoes an intermolecular interaction with the thermoplastic elastomer that is an asphalt-modifying component but also adsorbs on the aggregate. According to this, it may be considered that by imparting an effect for anchoring an aggregate on asphalt, which when using only a thermoplastic elastomer, has been unable to be realized so far, the flowability resistance is improved, and the durability of the paved surface after laying is improved, while remaining flexibility of the thermoplastic elastomer. In particular, among thermoplastic elastomers, SBS and SBR as mentioned later readily reveal this effect.

Examples of the alkylene oxide adduct of bisphenol A represented by the formula (I) include a propylene oxide adduct of bisphenol A [2,2-bis(4-hydroxyphenyl)propane] and an ethylene oxide adduct of bisphenol A. Of these, a combination of a propylene oxide adduct of bisphenol A and an ethylene oxide adduct of bisphenol A is preferred.

From the viewpoint of not only enhancing melt-dispersibility in the asphalt but also enhancing affinity with the thermoplastic elastomer and obtaining excellent durability, the amount of the alkylene oxide adduct of bisphenol A in the alcohol component is preferably 65 mol % or more, and more preferably 80 mol % or more, and it is 100 mol % or less.

A molar ratio of the propylene oxide adduct of bisphenol A to the ethylene oxide adduct of bisphenol A in the alcohol component is preferably 5/95 or more, and more preferably 10/90 or more, and from the viewpoint of not only enhancing melt-dispersibility in the asphalt but also enhancing affinity with the thermoplastic elastomer and obtaining excellent durability, the foregoing molar ratio is preferably 50/50 or less, more preferably 40/60 or less, and still more preferably 30/70 or less.

The aliphatic diol is, for example, an aliphatic diol having 2 or more and 20 or less carbon atoms. Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

The trihydric or higher-hydric alcohol is, for example, a trihydric alcohol. Examples of the trihydric or higher-hydric alcohol include glycerin.

<Carboxylic Acid Component>

Examples of the carboxylic acid component include aliphatic dicarboxylic acid compounds, aromatic dicarboxylic acid compounds, trivalent or higher-valent and hexavalent or lower-valent carboxylic acid compounds. These carboxylic acid components can be used alone or in combination of two or more thereof.

The carboxylic acid component in the polyester of the first embodiment is hereunder described.

From the viewpoint of more improving the durability, the carbon number of the main chain of the aliphatic dicarboxylic acid is preferably 3 or more, and more preferably 4 or more, and it is preferably 10 or less, and more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecane diacid, and a succinic acid substituted with an alkyl group having 1 or more and 20 or less carbon atoms or an alkenyl group having 2 or more and 20 or less carbon atoms, and anhydrides or alkyl esters (for example, the carbon number of the alkyl group is 1 or more and 3 or less) thereof.

Examples of the substituted succinic acid include dodecyl succinic acid, dodecenylsuccinic acid, and octenyl succinic acid.

Of the foregoing aliphatic dicarboxylic acid compounds, fumaric acid, maleic acid, and adipic acid are preferred, and adipic acid is more preferred.

From the viewpoint of enhancing the flexibility of the polyester to more improve the durability, the content of the aliphatic dicarboxylic acid compound based on the carboxylic acid component is preferably 1 mol % or more, more preferably 5 mol % or more, and still more preferably 10 mol % or more, and it is preferably 30 mol % or less, and more preferably 25 mol % or less.

Examples of the aromatic dicarboxylic acid compound include terephthalic acid, phthalic acid, isophthalic acid, and naphthalenedicarboxylic acid, and anhydrides or alkyl esters (for example, the carbon number of the alkyl group is 1 or more and 3 or less) thereof.

Of the foregoing aromatic dicarboxylic acids, terephthalic acid and isophthalic acid are preferred. Of these, from the viewpoint of more improving the durability, terephthalic acid is preferred.

From the viewpoint of enhancing affinity between the thermoplastic elastomer and the polyester and obtaining excellent durability, the content of the aromatic dicarboxylic acid compound based on the carboxylic acid component is preferably 65 mol % or more, and more preferably 70 mol % or more, and it is preferably 99 mol % or less, more preferably 95 mol % or less, and still more preferably 90 mol % or less.

The trivalent or higher-valent and hexavalent or lower-valent carboxylic acid compound is preferably a trivalent carboxylic acid.

Examples of the trivalent or higher-valent and hexavalent or lower-valent carboxylic acid compound include trimellitic acid, 2,5,7-naphthalenetricarboxylic acid, and pyromellitic acid.

From the viewpoint of controlling physical properties, a monohydric alcohol may be appropriately contained in the alcohol component, and a monovalent carboxylic acid compound may be appropriately contained in the carboxylic acid component.

The carboxylic acid component in the polyester of the second embodiment is hereunder described. Portions common to those in the carboxylic acid component of the polyester of the first embodiment are omitted, and only preferred modes in the polyester of the second embodiment are described.

From the viewpoint of more improving the durability, the carbon number of the main chain of the aliphatic dicarboxylic acid is preferably 3 or more, and it is preferably 10 or less, more preferably 6 or less, and still more preferably 4 or less.

Of the aliphatic dicarboxylic acid compounds, fumaric acid, maleic acid, and adipic acid are preferred, and fumaric acid is more preferred.

From the viewpoint of more improving the durability, the content of the aliphatic dicarboxylic acid compound based on the carboxylic acid component is preferably 65 mol % or more, more preferably 70 mol % or more, and still more preferably 75 mol % or more, and it is preferably 99 mol % or less, more preferably 95 mol % or less, and still more preferably 90 mol % or less.

From the viewpoint of obtaining excellent durability, the content of the aromatic dicarboxylic acid compound based on the carboxylic acid component is preferably 1 mol % or more, more preferably 5 mol % or more, and still more preferably 10 mol % or more, and it is preferably 30 mol % or less, and more preferably 25 mol % or less.
(Molar Ratio of Carboxylic Acid Component-Derived Structural Unit to Alcohol Component-Derived Structural Unit)

From the viewpoint of controlling an acid value, a molar ratio of the carboxylic acid component-derived structural unit to the alcohol component-derived structural unit [(carboxylic acid component)/(alcohol component)] is preferably 0.7 or more, and more preferably 0.8 or more, and it is preferably 1.5 or less, more preferably 1.3 or less, and still more preferably 1.1 or less.
(Physical Properties of Polyester)

From the viewpoint of obtaining the durability, the softening point of the polyester is 90° C. or higher, preferably 95° C. or higher, and more preferably 100° C. or higher, and it is preferably 140° C. or lower, more preferably 130° C. or lower, still more preferably 125° C. or lower, yet still more preferably 120° C. or lower, and even yet still more preferably 115° C. or lower.

From the viewpoint of promoting the absorption onto the aggregate and more improving the durability, an acid value of the polyester is preferably 2 mgKOH/g or more, more preferably 3 mgKOH/g or more, and still more preferably 5 mgKOH/g or more, and from the viewpoint of enhancing the water resistance of the paved surface, the acid value of the polyester is preferably 30 mgKOH/g or less, more preferably 20 mgKOH/g or less, and still more preferably 18 mgKOH/g or less.

From the viewpoint of more improving the durability, a hydroxyl value of the polyester is preferably 1 mgKOH/g or more, more preferably 2 mgKOH/g or more, still more preferably 5 mgKOH/g or more, and yet still more preferably 10 mgKOH/g or more, and it is preferably 70 mgKOH/g or less, more preferably 50 mgKOH/g or less, still more preferably 30 mgKOH/g or less, yet still more preferably 20 mgKOH/g or less, even yet still more preferably less than 20 mgKOH/g, and even still more preferably 18 mgKOH/g or less.

From the viewpoint of obtaining the durability and the viewpoint of improving the flowability resistance at a high temperature, the glass transition point of the polyester is 40° C. or higher, and more preferably 45° C. or higher, and it is 80° C. or lower, more preferably 70° C. or lower, and still more preferably 60° C. or lower.

The softening point, the acid value, the hydroxyl value, and the glass transition point can be measured by the methods described in the section of Examples. The softening point, the acid value, the hydroxyl value, and the glass transition point can be controlled according to a raw material monomer composition, a molecular weight, a catalyst amount, or a reaction condition.
(Production Method of Polyester)

Although a method for producing the polyester is not particularly limited, for example, the polyester can be produced by subjecting the alcohol component and the carboxylic acid component as mentioned above to polycondensation.

Although a temperature of the polycondensation reaction is not particularly limited, it is preferably 160° C. or higher and 260° C. or lower from the viewpoint of reactivity.

For the polycondensation reaction, a tin(II) compound not having an Sn—C bond, such as tin(II) di(2-ethylhexanoate), may be used as a catalyst in an amount of preferably 0.01 parts by mass or more, and more preferably 0.2 parts by mass or more, and it is preferably 1.5 parts by mass or less, and more preferably 0.6 parts by mass or less, based on 100 parts by mass of a total amount of the alcohol component and the carboxylic acid component.

For the polycondensation reaction, in addition to the catalyst, a pyrogallol compound, such as gallic acid, may be used as an esterification catalyst in an amount of preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of a total amount of the alcohol component and the carboxylic acid component.
(Ratio of Polyester)

In the asphalt composition, from the viewpoint of improving the durability, a ratio of the polyester is 1 part by mass or more, preferably 2 parts by mass or more, and more preferably 3 parts by mass or more, and it is 17 parts by mass or less, preferably 15 parts by mass or less, more preferably 12 parts by mass or less, still more preferably 10 parts by mass or less, yet still more preferably 7 parts by mass or less, even yet still more preferably 5 parts by mass or less, and even still more preferably 4 parts by mass or less, based on 100 parts by mass of the asphalt.
[Dispersant]

The asphalt composition may contain a dispersant.

The dispersant is preferably one capable of being dissolved in the asphalt and having affinity with the polyester.

Examples of the dispersant include polymer dispersants and surfactants, such as polyoxyethylene alkylamines and alkanolamines.

Examples of the polymer dispersant include a polyamide amine and a salt thereof, a polycarboxylic acid and a salt thereof, a high-molecular weight unsaturated acid ester, a modified polyurethane, a modified polyester, a modified poly(meth)acrylate, a (meth)acrylic copolymer, and a naphthalenesulfonic acid formalin condensate. These dispersants may be used alone or in combination of two or more thereof.

From the viewpoint of improving the high-temperature storage stability, the dispersant is preferably a polymer dispersant. It is to be noted that the "polymer dispersant" as referred to in the present invention means a dispersant having a weight average molecular weight of 1,000 or more. Although the weight average molecular weight varies with the polymer species, it is preferably 2,000 or more, and more preferably 4,000 or more, and it is preferably 80,000 or less, and more preferably 40,000 or less.

The dispersant preferably has a basic functional group. The basic functional group means a group such that a pKa of a conjugate acid is −3 or more.

Examples of the basic functional group include an amino group, an imino group, and a quaternary ammonium group A base number of the dispersant is preferably 10 mgKOH/g or more, more preferably 20 mgKOH/g or more, and still more preferably 30 mgKOH/g or more, and it is preferably 150 mgKOH/g or less, more preferably 120 mgKOH/g or less, and still more preferably 100 mgKOH/g or less.

As for the measurement method of the base number, the measurement is performed by the method prescribed in JIS K7237:1995.

Examples of the commercially available dispersant include "DISPER" Series "byk-101", "byk-130", "byk-161", "byk-162", "byk-170", "byk-2020", "byk-2164", and "byk-LPN21324" (all of which are manufactured by BYK Additives & Instruments; "SOLSPERSE" Series "9000", "11200", "13240", "13650", "13940", "17000", "18000", "24000", "28000", "32000", "38500", and "71000" (all of which are manufactured by Lubrizol Corp.); "AJISPER" Series "PB821", "PB822", "PB880", and "PB881" (all of which are manufactured by Ajinomoto Fine-Techno Co., Inc.); "EFKA" Series "46", "47", "48", "49", "4010", "4047", "4050", "4165", and "5010" (all of which are manufactured by BASF SE); "FLOWLEN TG-710" (manufactured by Kyoeisha Chemical Co., Ltd.); and "TAMN-15" (manufactured by Nikko Chemicals Co., Ltd.).

The content of the dispersant is preferably 1 part by mass or more, more preferably 3 parts by mass or more, and still more preferably 4 parts by mass or more, and it is preferably 80 parts by mass or less, more preferably 60 parts by mass or less, still more preferably 40 parts by mass or less, yet still more preferably 30 parts by mass or less, and even yet still more preferably 20 parts by mass or less, based on 100 parts by mass of the polyester.

[Asphalt Mixture]

The asphalt mixture according to the embodiment of the present invention contains the aforementioned asphalt composition and the aggregate. Namely, the asphalt mixture contains the asphalt, the thermoplastic elastomer, the polyester, and the aggregate.

From the viewpoint of more improving the durability, the content of the asphalt composition in the asphalt mixture is preferably 2% by mass or more, more preferably 3% by mass or more, and still more preferably 4% by mass or more, and it is preferably 15% by mass or less, more preferably 10% by mass or less, and still more preferably 8% by mass or less.

(Aggregate)

The aggregate can be, for example, optionally selected from crushed stone, cobble stone, gravel, sand, reclaimed aggregate, and ceramics, and used.

As the aggregate, all of a coarse aggregate having a particle diameter of 2.36 mm or more and a fine aggregate having a particle diameter of less than 2.36 mm can be used.

Examples of the coarse aggregate include crushed stone having a particle diameter range of 2.36 mm or more and 4.75 mm or less, crushed stone having a particle diameter range of 4.75 mm or more and 12.5 mm or less, crushed stone having a particle diameter range of 12.5 mm or more and 19 mm or less, and crushed stone having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and reclaimed aggregate-crushed sand.

The aforementioned particle diameter is a value prescribed in HS 5001:1995.

Of these, a combination of the coarse aggregate and the fine aggregate is preferred.

The fine aggregate may contain a filler having a particle diameter of less than 0.075 mm (for example, sand). A lower limit value of the average particle diameter of the filler is, for example, 0.001 mm or more.

From the viewpoint of improving the dry strength, the average particle diameter of the filler is preferably 0.001 mm or more, and it is preferably 0.05 mm or less, more preferably 0.03 mm or less, and still more preferably 0.02 mm or less. The average particle diameter of the filler can be measured by a laser diffraction particle size distribution analyzer. Here, the average particle diameter means an average particle diameter of 50% cumulative volume.

[Measurement Method of Average Particle Diameter of Filler]

The average particle diameter of the filler is a value measured by a laser diffraction particle size distribution analyzer (LA-950, manufactured by HORIBA, Ltd.) under the following condition.

Measurement method: Flow method
Dispersion medium: Ethanol
Sample preparation: 2 mg/100 mL
Dispersing method: Stirring and 1 minute of built-in ultrasonic waves Examples of the filler include sand, fly ash, calcium carbonate, and hydrated lime. Of these, calcium carbonate is preferred from the viewpoint of improving the dry strength.

A mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

The content of the aggregate is preferably 1,000 parts by mass or more, more preferably 1,200 parts by mass or more, and still more preferably 1,400 parts by mass or more, and it is preferably 3,000 parts by mass or less, more preferably 2,500 parts by mass or less, and still more preferably 2,000 parts by mass or less, based on 100 parts by mass of a sum total of the asphalt, the thermoplastic elastomer, and the polyester.

Suitable blending examples of the asphalt mixture are as follows.

(1) An example of the asphalt mixture includes, for example, 30% by volume or more and less than 45% by volume of the coarse aggregate, 30% by volume or more and 50% by volume or less of the fine aggregate, and 5% by volume or more and 10% by volume or less of the asphalt composition (fine-graded asphalt).

(2) An example of the asphalt mixture includes, for example, 45% by volume or more and less than 70% by volume of the coarse aggregate, 20% by volume or more and 45% by volume or less of the fine aggregate, and 3% by volume or more and 10% by volume or less of the asphalt composition (dense-graded asphalt).

(3) An example of the asphalt mixture includes, for example, 70% by volume or more and 80% by volume or less of the coarse aggregate, 10% by volume or more and 20% by volume or less of the fine aggregate, and 3% by volume or more and 10% by volume or less of the asphalt composition (porous asphalt).

In the asphalt mixture, other components may be further blended, as the need arises.

The blending ratio of the asphalt in the conventional asphalt mixtures containing the aggregate and the asphalt is in general adopted by referring to an optimum asphalt amount obtained from "Formulation and Design of Asphalt Mixture" as described in "Guideline for Pavement Design and Construction" published by Japan Road Association.

In this specification, the aforementioned optimum asphalt amount corresponds to the total amount of the asphalt, the thermoplastic elastomer, and the polyester. In consequence, in general, the total blending amount of the asphalt, the thermoplastic elastomer, and the polyester is preferably determined from the aforementioned optimum asphalt amount.

However, it is not needed to limit the optimum asphalt amount to the method as described in "Guideline for Pavement Design and Construction", and it may also be determined by any other methods.

[Production Method of Asphalt Mixture]

From the viewpoint of more improving the durability, a method for producing the asphalt mixture according to the embodiment of the present invention includes a step of mixing the heated aggregate, the asphalt, the thermoplastic elastomer, and the polyester as mentioned above.

As the specific production method, there is exemplified the conventional production method of an asphalt mixture which is called a plant mix method, a premix method, or the like. All of these methods are concerned with a method for adding the asphalt, the thermoplastic elastomer, and the polyester to the heated aggregate. Examples of the addition method include a premix method in which the asphalt, the thermoplastic elastomer, and the polyester are previously dissolved; and a plant mix method in which modified asphalt having the thermoplastic elastomer dissolved in the asphalt is added, and then, the polyester is charged. Of these, the premix method is preferred.

More specifically, in the production method of the asphalt mixture, the mixing step is preferably (i) a method in which the asphalt and the thermoplastic elastomer are added to and mixed with the heated aggregate, and then, the polyester is added and mixed; or (ii) a method in which the asphalt, the thermoplastic elastomer, and the polyester are simultaneously added to and mixed with the heated aggregate.

Of these, the method (i) is preferred.

In the mixing step, from the viewpoint of durability, a temperature of the heated aggregate is preferably a temperature higher than the softening point of the polyester. The temperature of the heated aggregate is preferably 130° C. or higher, more preferably 150° C. or higher, still more preferably 170° C. or higher, and yet still more preferably 180° C. or higher, and from the viewpoint of preventing thermal degradation of the asphalt from occurring, the temperature of the heated aggregate is preferably 230° C. or lower, more preferably 210° C. or lower, and still more preferably 200° C. or lower.

In the mixing step, a mixing temperature is preferably a temperature higher than the softening point of the polyester. The mixing temperature is preferably 130° C. or higher, more preferably 150° C. or higher, still more preferably 170° C. or higher, and yet still more preferably 180° C. or higher, and from the viewpoint of preventing thermal degradation of the asphalt from occurring, the mixing temperature is preferably 230° C. or lower, more preferably 210° C. or lower, and still more preferably 200° C. or lower.

In the mixing step, a mixing time is, for example, 30 seconds or more, preferably 1 minute or more, more preferably 2 minutes or more, and still more preferably 5 minutes or more. Although an upper limit of the time is not particularly limited, it is, for example, about 30 minutes.

From the viewpoint of more improving the durability, the production method of the asphalt mixture preferably includes a step of, after the mixing step, holding the resulting mixture at a temperature equal to or higher than the softening point of the polyester.

In the holding step, though the mixture may be further mixed, the mixture may be held at a temperature equal to or higher than the aforementioned temperature.

In the holding step, the mixing temperature is preferably a temperature higher than the softening point of the polyester, more preferably 130° C. or higher, still more preferably 150° C. or higher, yet still more preferably 170° C. or higher, and even yet still more preferably 180° C. or higher, and from the viewpoint of preventing thermal degradation of the asphalt composition from occurring, the mixing temperature is preferably 230° C. or lower, more preferably 210° C. or lower, and still more preferably 200° C. or lower.

A holding time in the holding step is preferably 0.5 hours or more, more preferably 1 hour or more, and still more preferably 1.5 hours or more. Although an upper limit of the time is not particularly limited, it is, for example, about 5 hours.

[Road Paving Method]

The asphalt mixture is used for road pavement.

The road paving method preferably includes a step of laying the aforementioned asphalt mixture, thereby forming an asphalt paving material layer.

The asphalt paving material layer is preferably a base layer or a surface layer.

The asphalt mixture may be subjected to compacting laying using a known laying machine and the same laying method. In the case of using the asphalt mixture as the heated asphalt mixture, a compacting temperature thereof is preferably a temperature higher than the softening point of the polyester. The compacting temperature is preferably 100° C. or higher, more preferably 120° C. or higher, and still more preferably 130° C. or higher, and it is preferably 200° C. or lower, and more preferably 180° C. or lower.

With respect to the aforementioned embodiments, the specification further discloses the following asphalt composition, asphalt mixture, and so on. It should be construed that it is possible to replace the terms "containing" and "including" by "comprising".

<1> An asphalt composition containing asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is 1 part by mass or more and 17 parts by mass or less based on 100 parts by mass of the asphalt.

<2> The asphalt composition as set forth in <1>, wherein the polyester contains an alcohol component-derived structural unit containing 60 mol % or more of an alkylene oxide adduct of bisphenol A and a carboxylic acid component-derived structural unit.

<3> The asphalt composition as set forth in <2>, wherein the polyester contains 50 mol % or more of an aromatic dicarboxylic acid compound based on the carboxylic acid component.

<4> The asphalt composition as set forth in <2>, wherein the polyester contains 50 mol % or more of an aliphatic dicarboxylic acid compound based on the carboxylic acid component.

<5> The asphalt composition as set forth in any of <1> to <4>, wherein the polyester has a hydroxyl value of 1 mgKOH/g or more and 70 mgKOH/g or less.

<6> The asphalt composition as set forth in any of <1> to <5>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

<7> The asphalt composition as set forth in any of <1> to <6>, wherein the thermoplastic elastomer is at least one selected from the group consisting of a styrene/butadiene block copolymer, a styrene/butadiene/styrene block copolymer, a styrene/butadiene random copolymer, a styrene/ isoprene block copolymer, a styrene/isoprene/styrene block copolymer, and a styrene/isoprene random copolymer.

<8> An asphalt mixture including the asphalt composition as set forth above in any of <1> to <7> and an aggregate.

<9> A method for producing an asphalt mixture, including a step of mixing a heated aggregate, asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is 1 part by mass or more and 17 parts by mass or less based on 100 parts by mass of the asphalt.

<10> The method for producing an asphalt mixture as set forth in <9>, wherein in the mixing step, (i) the asphalt and the thermoplastic elastomer are added to and mixed with the heated aggregate, and then, the polyester is added and mixed; or (ii) the asphalt, the thermoplastic elastomer, and the polyester are simultaneously added to and mixed with the heated aggregate.

<11> The method for producing an asphalt mixture as set forth in <9> or <10>, wherein the polyester contains an alcohol component-derived structural unit containing 60 mol % or more of an alkylene oxide adduct of bisphenol A and a carboxylic acid component-derived structural unit.

<12> The method for producing an asphalt mixture as set forth in <11>, wherein the polyester contains 50 mol % or more of an aromatic dicarboxylic acid compound based on the carboxylic acid component.

<13> The method for producing an asphalt mixture as set forth in <11>, wherein the polyester contains 50 mol % or more of an aliphatic dicarboxylic acid compound based on the carboxylic acid component.

<14> The method for producing an asphalt mixture as set forth in any of <9> to <13>, wherein the polyester has a hydroxyl value of 1 mgKOH/g or more and 70 mgKOH/g or less.

<15> The method for producing an asphalt mixture as set forth in any of <9> to <14>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

<16> The method for producing an asphalt mixture as set forth in any of <9> to <15>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

<17> Use of the asphalt composition as set forth in any of <1> to <7> for road pavement.

<18> Use of the asphalt mixture as set forth in <8> for road pavement.

EXAMPLES

Respective physical values of resins and the like were measured and evaluated by the following methods.

[Measurement Method]

[Acid Value and Hydroxyl Value of Polyester]

An acid value and a hydroxyl value of a polyester were each measured on the basis of the method of JIS K0070: 1992. However, only the measuring solvent was changed from a mixed solvent of ethanol and ether as prescribed in JIS K0070:1992 to a mixed solvent of acetone and toluene (acetone/toluene=1/1 (volume ratio)).

[Softening Point and Glass Transition Point of Polyester]

(1) Softening Point

Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Glass Transition Point

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the measurement was performed while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

[Evaluation]

[Durability]

Using a Hamburg wheel tracking tester (load: 705 N, iron wheel width: 47 mm, linear pressure: 150 N/cm) as used for the durability test, a test specimen was immersed in warm water set at 60° C. and measured for a displacement at the number of tire passes of 10,000 and 20,000, respectively. The measurement condition followed AASHTO T-324-04 (2008) except for the immersion temperature.

Although it cannot be unequivocally said depending upon the traffic state, the displacement of 0.5 mm at the number of tire passes of 20,000 is corresponding to 1 to 2 years in terms of service life and is a significant difference which can be distinguished in terms of practical durability.

Production Examples A1 to A3 (Resins A-1 to A-3)

In a 5 liter-volume four-necked flask equipped with a thermometer, a stainless steel-made stirring rod, a flow-down type condenser, and a nitrogen inlet tube, an alcohol component and terephthalic acid for a polyester, which are shown in Table 1, were charged, and 20 g of tin(II) di(2-ethylhexanoate) and 2 g of gallic acid were added in a nitrogen atmosphere. The temperature was raised to 235° C. over 3 hours in a mantle heater, and after the temperature reached 235° C., the contents were held for 7 hours. Then, the reaction was performed under reduced pressure at 8.0 kPa for 1 hour. Thereafter, the resultant was cooled to 180° C., the residual acid was charged, and the temperature was then raised to 210° C. over 2 hours. The temperature was held at 210° C. for 1 hour, and the reaction was further performed under reduced pressure at 8.0 kPa, followed by performing the reaction until reaching a softening point shown in the table. There were thus obtained the target Resins A-1 to A-3.

Production Examples A4, A6, and A7 (Resins A-4, A-6, and A-7)

In a 5 liter-volume four-necked flask equipped with a thermometer, a stainless steel-made stirring rod, a flow-down type condenser, and a nitrogen inlet tube, an alcohol component and a carboxylic acid component for a polyester, which are shown in Table 1, were charged, and 20 g of tin(II) di(2-ethylhexanoate), 2 g of gallic acid, and 2 g of t-butyl-catechol were added in a nitrogen atmosphere. The temperature was raised to 210° C. over 5 hours in a mantle heater, and after the temperature reached 210° C., the contents were held for 2 hours. Then, the reaction was performed under reduced pressure at 8.0 kPa, followed by performing the reaction until reaching a softening point shown in the table. There were thus obtained the target Resins A-4, A-6, and A-7.

Production Example A5 (Resin A-5)

In a 5 liter-volume four-necked flask equipped with a thermometer, a stainless steel-made stirring rod, a flow-down type condenser, and a nitrogen inlet tube, an alcohol component and terephthalic acid for a polyester, which are shown in Table 1, were charged, and 20 g of tin(II) di(2-ethylhexanoate) and 2 g of gallic acid were added in a nitrogen atmosphere. The temperature was raised to 235° C. over 10 hours in a mantle heater, and after the temperature reached 235° C., the contents were held for 5 hours. Then, the reaction was performed under reduced pressure at 8.0 kPa for 1 hour. Thereafter, the resultant was cooled to 180° C., and then, fumaric acid, adipic acid, and 2 g of t-butyl-catechol were charged. The temperature was raised to 210° C. over 2 hours, and the temperature was held at 210° C. for 1 hour. Then, the reaction was performed under reduced pressure at 8.0 kPa, followed by performing the reaction until reaching a softening point shown in the table. There was thus obtained the target Resin A-5.

TABLE 1

| | | | Production Example | | | | | | | |
|---|---|---|---|---|---|---|---|---|---|---|
| | | | A1 A-1 | | A2 A-2 | | A3 A-3 | | A4 A-4 | |
| Resin | | | Charged amount (g) | Molar ratio *3 | Charged amount (g) | Molar ratio *3 | Charged amount (g) | Molar ratio *3 | Charged amount (g) | Molar ratio *3 |
| Raw material monomer | Alcohol component | BPA-PO *1 | 710 | 25 | 2872 | 100 | 710 | 25 | 785 | 25 |
| | | BPA-EO *2 | 1977 | 75 | — | — | 1977 | 75 | 2186 | 75 |
| | | Ethylene glycol | — | — | — | — | — | — | — | — |
| | Carboxylic acid component | Terephthalic acid | 1077 | 80 | 749 | 55 | 1077 | 80 | — | — |
| | | Fumaric acid | — | — | — | — | — | — | 832 | 80 |
| | | Trimellitic anhydride | — | — | 79 | 5 | — | — | — | — |
| | | Adipic acid | 237 | 20 | 300 | 25 | 237 | 20 | 196 | 15 |
| Physical properties | Softening point (° C.) | | 103.6 | | 99.6 | | 107.5 | | 95.0 | |
| | Acid value (mgKOH/g) | | 12.7 | | 2.9 | | 10.9 | | 15.0 | |
| | Hydroxyl value (mgKOH/g) | | 13.3 | | 32.2 | | 12.6 | | 21.5 | |
| | Glass transition point (° C.) | | 57.8 | | 52 | | 58 | | 49 | |

| | | | Production Example | | | | | |
|---|---|---|---|---|---|---|---|---|
| | | | A5 A-5 | | A6 A-6 | | A7 A-7 | |
| Resin | | | Charged amount (g) | Molar ratio *3 | Charged amount (g) | Molar ratio *3 | Charged amount (g) | Molar ratio *3 |
| Raw material monomer | Alcohol component | BPA-PO *1 | 989 | 25 | 611 | 20 | 603 | 20 |
| | | BPA-EO *2 | 918 | 25 | 2271 | 80 | 2241 | 80 |
| | | Ethylene glycol | 350 | 50 | — | — | — | — |
| | Carboxylic acid component | Terephthalic acid | 1595 | 85 | — | — | — | — |
| | | Fumaric acid | 66 | 5 | 608 | 60 | 400 | 40 |
| | | Trimellitic anhydride | — | — | — | — | — | — |
| | | Adipic acid | 83 | 5 | 510 | 40 | 755 | 60 |
| Physical properties | Softening point (° C.) | | 102.0 | | 87.0 | | 85.2 | |
| | Acid value (mgKOH/g) | | 18.2 | | 20.3 | | 9.4 | |
| | Hydroxyl value (mgKOH/g) | | 49.2 | | 25.4 | | 11.5 | |
| | Glass transition point (° C.) | | 54 | | 45 | | 38 | |

*1 BPA-PO: Poly oxypropylene (2.2) adduct of bisphenol A
*2 BPA-EO: Polyoxyethylene (2.2) adduct of bisphenol A
*3 Molar amount based on 100 mol of alcohol component (molar ratio)

Example A1

In a 3-liter stainless steel vessel, 2,200 g of modified asphalt containing 3% by mass of SBS (manufactured by FESPA, Mexico) heated to 180° C. was charged as a binder mixture and stirred at 100 rpm, to which was then added 3.4 g of a dispersant "SOLSPERS 11200" (manufactured by Lubrizol Corp., a polymer dispersant having a basic functional group, base number: 37 mgKOH/g). Thereafter, 68 g of the polyester was gradually added, and the contents were stirred at 500 rpm for 2 hours, thereby preparing Asphalt Composition AS-1. A component ratio of the prepared Asphalt Composition AS-1 is shown in Table 2.

Subsequently, an aggregate produced in La Vega (Mexico) heated to 190° C. (see a composition of the aggregate as shown below) was charged in a mixer for asphalt and mixed at 190° C. for 30 seconds.

Subsequently, 552 g of the aforementioned Asphalt Composition AS-1 was added and mixed in the mixer for asphalt for 2 minutes. The resulting asphalt mixture was stored at 180° C. for 2 hours and then charged in a gyratory compactor (a circular molding machine, manufactured by Cooper Research Technology, load: 600 kPa, 100 rotation pressure), thereby obtaining a specimen. The various evaluation tests were performed, and the results are shown in Table 3.

<Composition of Aggregate Produced in La Vega (Mexico)>
Passing mass %:
Sieve opening 19 mm: 100% by mass
Sieve opening 12.5 mm: 81.3% by mass
Sieve opening 9.5 mm: 68.1% by mass
Sieve opening 4.75 mm: 45.1% by mass
Sieve opening 2.36 mm: 31.3% by mass
Sieve opening 1.18 mm: 18.5% by mass
Sieve opening 0.6 mm: 11.5% by mass
Sieve opening 0.3 mm: 8.1% by mass
Sieve opening 0.15 mm: 6.1% by mass
Sieve opening 0.075 mm: 4.5% by mass

Examples A2 to A6 and A8 and Comparative Examples A1 to A4

Specimens were obtained in the same manner as in Example A1, except for using components having the kind and amount shown in Tables 2 and 3. The various evaluation tests were performed, and results thereof are shown in Table 3.

Example A7

In a 3-liter stainless steel vessel, 2,200 g of modified asphalt containing 2.2% by mass of SBS (manufactured by ARO, Mexico) heated to 180° C. was charged as a binder mixture and stirred at 100 rpm, to which was then added 3.4 g of a dispersant "SOLSPERS 11200" (manufactured by Lubrizol Corp.). Thereafter, 68 g of the polyester (Resin A-1) was gradually added, and the contents were stirred at 500 rpm for 2 hours, thereby preparing Asphalt Composition AS-7. A component ratio of the prepared Asphalt Composition AS-7 is shown in Table 2.

In a mixing machine for asphalt, 9,200 g of an aggregate produced in Carretera (aggregate Grava: 2,300 g, aggregate Sello: 2,300 g, aggregate Arena: 4,600 g (see a composition of the aggregate as shown below)) which had been previously heated to 190° C. was charged and mixed at 190° C. for 30 seconds. Subsequently, 640 g of the aforementioned asphalt composition was added and mixed in the mixer for asphalt for 2 minutes. The resulting asphalt mixture was stored at 180° C. for 2 hours and then charged in a gyratory compactor (a circular molding machine, manufactured by Cooper Research Technology, load: 600 kPa, 100 rotation pressure), thereby obtaining a specimen. The various evaluation tests were performed, and the results are shown in Table 3.

<Composition of Aggregate Produced in Carretera (Mexico)>
Passing mass %:
Sieve opening 19 mm: 98.7% by mass
Sieve opening 12.5 mm: 84.4% by mass
Sieve opening 9.5 mm: 76.7% by mass
Sieve opening 4.75 mm: 57.5% by mass
Sieve opening 2.36 mm: 34.3% by mass
Sieve opening 1.18 mm: 22.6% by mass
Sieve opening 0.6 mm: 13.8% by mass
Sieve opening 0.3 mm: 10.3% by mass
Sieve opening 0.15 mm: 7.8% by mass
Sieve opening 0.075 mm: 4.6% by mass

TABLE 2

| | | Asphalt composition | | | | | | | | |
|---|---|---|---|---|---|---|---|---|---|---|
| | | Binder mixture | | | | Polyester | | | Surfactant | |
| | Kind | Kind *1 | Blending amount (g) | Asphalt Ratio *3 (mass %) | Thermoplastic elastomer | | Blending amount (g) | Ratio *3 (mass %) | Ratio *2 (parts by mass) | Blending amount (g) | Ratio *3 (mass %) |
| | | | | | Kind | Ratio *3 (mass %) | Kind | | | | |
| Example A1 | AS-1 | MAS-1 | 2200 | 94 | SBS | 3 | A-1 | 68 | 3 | 3 | 3.4 | 0.1 |
| Example A2 | AS-2 | MAS-1 | 2200 | 92 | SBS | 3 | A-1 | 110 | 5 | 5 | 3.4 | 0.1 |
| Example A3 | AS-3 | MAS-1 | 2200 | 87 | SBS | 3 | A-1 | 242 | 10 | 11 | 3.4 | 0.1 |
| Example A4 | AS-4 | MAS-1 | 2200 | 94 | SBS | 3 | A-2 | 68 | 3 | 3 | 3.4 | 0.1 |
| Example A5 | AS-5 | MAS-1 | 2200 | 94 | SBS | 3 | A-3 | 68 | 3 | 3 | 3.4 | 0.1 |
| Example A6 | AS-6 | MAS-1 | 2200 | 94 | SBS | 3 | A-4 | 68 | 3 | 3 | 3.4 | 0.1 |
| Example A7 | AS-7 | MAS-2 | 2200 | 95 | SBS | 2 | A-1 | 68 | 3 | 3 | 3.4 | 0.1 |
| Example A8 | AS-8 | MAS-1 | 2200 | 94 | SBS | 3 | A-5 | 68 | 3 | 3 | 3.4 | 0.1 |
| Comparative Example A1 | AS-51 | MAS-1 | 2200 | 97 | SBS | 3 | — | — | — | — | 3.4 | 0.1 |
| Comparative Example A2 | AS-52 | SAS-1 | 2200 | 95 | — | 0 | A-1 | 110 | 5 | 5 | 3.4 | 0.1 |

TABLE 2-continued

| | | Asphalt composition | | | | | | | | |
|---|---|---|---|---|---|---|---|---|---|---|
| | | Binder mixture | | | | Polyester | | | Surfactant | |
| | | | Blending amount (g) | Asphalt Ratio *3 (mass %) | Thermoplastic elastomer | | | Blending Ratio *3 (parts by mass) | Blending amount (g) | Ratio *3 (mass %) |
| | Kind | Kind *1 | | | Kind | Ratio *3 (mass %) | Kind | Blending amount (g) | Ratio *3 (mass %) | |
| Comparative Example A3 | AS-53 | MAS-1 | 2200 | 94 | SBS | 3 | A-6 | 68 | 3 | 3 | 3.4 | 0.1 |
| Comparative Example A4 | AS-54 | MAS-1 | 2200 | 94 | SBS | 3 | A-7 | 68 | 3 | 3 | 3.4 | 0.1 |

*1 MAS-1: Modified asphalt containing 3% by mass of SBS MAS-2: Modified asphalt containing 2.2% by mass of SBS SAS-1: Straight asphalt
*2 Ratio based on 100 parts by mass of asphalt (parts by mass)
*3 Proportion relative to the whole of asphalt composition

TABLE 3

| | Asphalt mixture | | | | | | | | Evaluation | |
|---|---|---|---|---|---|---|---|---|---|---|
| | Asphalt composition | | | | | Aggregate | | | Displacement in Hamburg (at 60° C.) | |
| | | | Polyester | | | | Coarse aggregate | Fine aggregate | (mm) | |
| | | Binder mixture Kind *1 | Kind | Ratio *2 (parts by mass) | Blending amount (g) | Kind *4 | Blending amount (g) | Proportion *3 (mass %) | Proportion *3 (mass %) | 10,000 times | 20,000 times |
| | Kind | | | | | | | | | | |
| Example A1 | AS-1 | MAS-1 | A-1 | 3 | 552 | AGG-1 | 9200 | 68.7 | 31.3 | 4.2 | 5.0 |
| Example A2 | AS-2 | MAS-1 | A-1 | 5 | 564 | AGG-1 | 9200 | 68.7 | 31.3 | 4.3 | 5.4 |
| Example A3 | AS-3 | MAS-1 | A-1 | 11 | 595 | AGG-1 | 9200 | 68.7 | 31.3 | 5.0 | 5.5 |
| Example A4 | AS-4 | MAS-1 | A-2 | 3 | 552 | AGG-1 | 9200 | 68.7 | 31.3 | 5.5 | 7.5 |
| Example A5 | AS-5 | MAS-1 | A-3 | 3 | 552 | AGG-1 | 9200 | 68.7 | 31.3 | 3.8 | 4.5 |
| Example A6 | AS-6 | MAS-1 | A-4 | 3 | 552 | AGG-1 | 9200 | 68.7 | 31.3 | 5.2 | 6.0 |
| Example A7 | AS-7 | MAS-2 | A-1 | 3 | 640 | AGG-2 | 9200 | 65.7 | 34.3 | — | 4.0 |
| Example A8 | AS-8 | MAS-1 | A-5 | 3 | 552 | AGG-1 | 9200 | 68.7 | 31.3 | 7.0 | 9.0 |
| Comparative Example A1 | AS-51 | MAS-1 | — | 0 | 535 | AGG-1 | 9200 | 68.7 | 31.3 | 9.9 | 15.5 |
| Comparative Example A2 | AS-52 | SAS-1 | A-1 | 5 | 564 | AGG-1 | 9200 | 68.7 | 31.3 | 8.0 | 10.0 |
| Comparative Example A3 | AS-53 | MAS-1 | A-6 | 3 | 552 | AGG-1 | 9200 | 68.7 | 31.3 | 7.6 | 9.5 |
| Comparative Example A4 | AS-54 | MAS-1 | A-7 | 3 | 552 | AGG-1 | 9200 | 68.7 | 31.3 | 8.3 | 10.8 |

*1 MAS-1: Modified asphalt containing 3% by mass of SBS MAS-2: Modified asphalt containing 2.2% by mass of SBS SAS-1: Straight asphalt
*2 Ratio based on 100 parts by mass of asphalt (parts by mass)
*3 Proportion relative to the whole of aggregate
*4 AGG-1: Aggregate produced in La Vega (Mexico) AGG-2: Aggregate produced in Carretera (Mexico)

Example B1

In a mixing machine for asphalt, an aggregate produced in Carretera (coarse aggregate Grava: 2,300 g, coarse aggregate Sello: 2,300 g, fine aggregate Arena: 4,600 g (the composition of the aggregate is the same as mentioned above)) which had been previously heated to 190° C. was charged and mixed at 190° C. for 30 seconds. Subsequently, 640 g of modified asphalt containing 2.2% by mass of SBS (manufactured by ARO, Mexico) was added and mixed in the mixer for asphalt for 1 minute. Subsequently, 20 g of the Resin A-1 was added and mixed for 1 minute. The resulting asphalt mixture was stored at 180° C. for 2 hours and then charged in a gyratory compactor (a circular molding machine, manufactured by Cooper Research Technology, load: 600 kPa, 100 rotation pressure), thereby obtaining a specimen. The durability test was performed. As a result, a displacement at the number of tire passes of 20,000 was 6 mm.

Comparative Example B1

In a mixing machine for asphalt, an aggregate produced in Carretera (coarse aggregate Grava: 2,300 g, coarse aggregate Sello: 2,300 g, fine aggregate Arena: 4,600 g (the composition of the aggregate is the same as mentioned above)) heated to 190° C. was charged and mixed at 190° C. for 30 seconds. Subsequently, 660 g of modified asphalt containing 2.2% by mass of SBS was added and mixed in the mixer for asphalt for 1 minute. The resulting asphalt mixture was stored at 180° C. for 2 hours and then charged in a gyratory compactor (a circular molding machine, manufactured by Cooper Research Technology, load: 600 kPa, 100 rotation pressure), thereby obtaining a specimen. The durability test was performed. As a result, a displacement at the number of tire passes of 20,000 was 10 mm.

It can be understood that the Examples are excellent in the durability as compared with the Comparative Examples.

The invention claimed is:

1. An asphalt composition comprising asphalt, a thermoplastic elastomer, and a polyester, wherein
the polyester has a softening point of 90° C. or higher and 140° C. or lower and a glass transition point of 40° C. or higher and 80° C. or lower, and
a ratio of the polyester is 1 part by mass or more and 17 parts by mass or less based on 100 parts by mass of the asphalt.

2. The asphalt composition according to claim 1, wherein the polyester comprises an alcohol component-derived structural unit containing 60 mol % or more of an alkylene oxide adduct of bisphenol A and a carboxylic acid component-derived structural unit.

3. The asphalt composition according to claim 2, wherein the polyester comprises 50 mol % or more of an aromatic dicarboxylic acid compound based on the carboxylic acid component.

4. The asphalt composition according to claim 2, wherein the polyester comprises 50 mol % or more of an aliphatic dicarboxylic acid compound based on the carboxylic acid component.

5. The asphalt composition according to claim 1, wherein the polyester has a hydroxyl value of 1 mgKOH/g or more and 70 mgKOH/g or less.

6. The asphalt composition according to claim 1, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

7. The asphalt composition according to claim 1, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

8. An asphalt mixture comprising the asphalt composition according to claim 1 and an aggregate.

9. A method for producing an asphalt mixture, comprising a step of mixing a heated aggregate, asphalt, a thermoplastic elastomer, and a polyester, wherein
the polyester has a softening point of 90° C. or higher and 140° C. or lower and a glass transition point of 40° C. or higher and 80° C. or lower, and
a ratio of the polyester is 1 part by mass or more and 17 parts by mass or less based on 100 parts by mass of the asphalt.

10. The method for producing an asphalt mixture according to claim 9, wherein in the mixing step,
(i) the asphalt and the thermoplastic elastomer are added to and mixed with the heated aggregate, and then, the polyester is added and mixed; or
(ii) the asphalt, the thermoplastic elastomer, and the polyester are simultaneously added to and mixed with the heated aggregate.

* * * * *